(12) United States Patent
Joshi

(10) Patent No.: US 6,919,283 B2
(45) Date of Patent: Jul. 19, 2005

(54) FABRICATION OF PURE AND MODIFIED TA$_2$O$_5$ THIN FILM WITH ENHANCED PROPERTIES FOR MICROWAVE COMMUNICATION, DYNAMIC RANDOM ACCESS MEMORY AND INTEGRATED ELECTRONIC APPLICATIONS

(75) Inventor: Pooran C. Joshi, Vancouver, WA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/661,547

(22) Filed: Sep. 15, 2003

(65) Prior Publication Data

US 2004/0209485 A1 Oct. 21, 2004

Related U.S. Application Data

(62) Division of application No. 09/855,549, filed on May 16, 2001, now abandoned.
(60) Provisional application No. 60/205,140, filed on May 18, 2000.

(51) Int. Cl.$^7$ ................................ H01L 21/31
(52) U.S. Cl. ................ 438/778; 438/240; 438/780; 438/781; 438/782; 438/785
(58) Field of Search ................ 438/240, 778, 438/780–782, 785

(56) References Cited

U.S. PATENT DOCUMENTS

| | | | | |
|---|---|---|---|---|
| 5,468,514 A | * | 11/1995 | Tomita | ............ 427/77 |
| 6,133,086 A | * | 10/2000 | Huang et al. | ............ 438/240 |

* cited by examiner

Primary Examiner—Mary Wilczewski
Assistant Examiner—Toniae M. Thomas
(74) Attorney, Agent, or Firm—William V. Adams

(57) ABSTRACT

This invention is directed to pure and modified Ta$_2$O$_5$ thin films deposited on suitable substrate and methods for making these Ta$_2$O$_5$ thin films. These Ta$_2$O$_5$ thin films exhibit superior properties for microwave communication, dynamic random access memory and integrated electronic applications. The Ta$_2$O$_5$ thin films perform well in these types of technologies due to the Ta$_2$O$_5$ thin film component which allows for high dielectric constants, low dielectric loss, and good temperature and frequency stability, thus making them particularly useful in high frequency microwave applications.

8 Claims, 4 Drawing Sheets

| 0.9Ta$_2$O$_5$-0.1Al$_2$O$_3$ THIN FILMS | |
|---|---|
| DIELECTRIC CONSTANT | 42.8 |
| DISSIPATION FACTOR | 0.005 |
| CHARGE STORAGE DENSITY | 18.9 fC/μm$^2$ |
| | (AT 0.5 MV/cm) |
| LEAKAGE CURRENT | <10$^{-9}$ A/cm$^2$ |
| DENSITY | (AT 0.5 MV/cm) |
| TEMPERATURE COEFFICIENT | -20 ppm/°C |
| OF CAPACITANCE | (RANGE 25-125 °C) |
| BIAS STABILITY | 0.4% |
| OF CAPACITANCE | (UP to 1 MV/cm) |

FABRICATION OF PURE AND MODIFIED TA₂O₅ THIN FILM WITH ENHANCED PROPERTIES FOR MICROWAVE COMMUNICATION, DYNAMIC RANDOM ACCESS MEMORY AND INTEGRATED ELECTRONIC APPLICATIONS

CROSS REFERENCE TO RELATED APPLICATIONS

This Application is a Division of prior Application No. 09/855,549, filed May 16, 2001, now abandoned which claims the benefit of Provisional Application 60/205,140, filed May 18, 2000.

STATEMENT OF GOVERNMENT INTEREST

The invention described herein may be manufactured and used by or for the Government of the United States of America for government purposes without the payment of any royalties therefor.

BACKGROUND OF THE INVENTION

Microwave components and systems are of immense importance for commercial and defense applications. Thin film technology has become integral for the fabrication of microwave components and systems. Due to continuously increasing microwave frequencies with decreased feature sizes, thin film technology has found wide spread applications.

Thin film microwave circuits require substrates which have very low dielectric loss at microwave frequencies. Dielectric materials having high dielectric constant and low dielectric loss at microwave frequencies are required to minimize losses in the microwave systems. Substrate properties, such as surface finish, and the fabrication processes, such as metallization and definition, determine the microwave circuit performance.

For optimum performance, the microwave substrate requires low loss tangent to reduce dielectric loss. The microwave substrate also requires that the dielectric constant remain stable during the batch manufacturing process. Additionally, the substrate requires a smooth surface finish to minimize conductor Ohmic losses; high chemical resistance; and stable temperature and frequency of the dielectric properties.

Thin films of dielectric materials having high dielectric constant, low dielectric loss, and good temperature and frequency stability are attractive for high frequency microwave applications.

Thin film processing technology allows fabrication of small conductive and resistive patterns for high frequency applications. Thin films of dielectric materials also offer a great variety of applications in semiconductor device technology, including but not limited to etching masks, barrier layers, gate oxide, separation of active and passive components, and electrical isolation between conductive regions.

Thin films of high dielectric constant materials have attracted considerable attention for their potential applications in dynamic random access memory devices. Although many materials possess high dielectric constants which are capable of substantially increasing capacitance, thin film technology has not been benefited. This is because materials capable of high dielectric constants are often plagued with poor leakage characteristics, incompatible for manufacturing purposes, unable to extend for multiple generations, unstable for subsequent processing, i.e. multiple metallization layers, substantially impact on existing complimentary metal-oxide-semiconductor (CMOS) structures, and do not provide optimal design characteristics to allow for proper temperature and bias stability.

Due to its high dielectric constant low leakage current, low defect density and high breakdown field strength, $Ta_2O_5$ is a promising material for thin film applications. $Ta_2O_5$ has particular applicability in high density dynamic random access memories (DRAMSs), integrated capacitor, electroluminescent display devices, and gate dielectrics of metal-oxide-semiconductor (MOS) devices ( see M. Anthony et al, TI Technical Journal 12, 30 (1995)).

$Ta_2O_5$ is a suitable alternative to conventional insulator materials like $Si_3N_4$ and $SiO_2$ in VLSI technology. The high dielectric constant and low loss insulating materials are also attractive for microwave devices. For successful integration into these electronic devices, extremely reliable $Ta_2O_5$ films with high, temperature and field stability are desired.

Recently, there has been interest in $Ta_2O_5$ based composite insulator because of the improved electrical properties compared to other insulating materials. It has been shown that the electrical properties of bulk $Ta_2O_5$ can be significantly improved through substitution of $Al_2O_3$ and $TiO_2$ (see R. J. Cava et al, Nature 377, 215 (1995) and Appl. Phys. Lett. 70, 1396 (1997)).

For microelectronic applications good quality thin films of these composite materials with enhanced electrical properties, meeting the requirements of integrated electronic devices, are required.

SUMMARY OF THE INVENTION

The present invention describes a chemical precursor solution process for the fabrication of $Ta_2O_5$ and $Ta_2O_5$ based composite insulating thin films with enhanced electrical properties for microelectronic applications. A room temperature precursor solution preparation process has been developed for the fabrication of thin films. The developed process is compatible with existing semiconductor processing technology. The present process is simple and cost-effective for the fabrication of pure and modified $Ta_2O_5$ thin films for various electronic applications.

Thin films of pure and modified $Ta_2O_5$ show significant enhancement in electrical properties desirable for various electronic applications. The enhancement in electrical properties of thin films prepared by the present chemical solution process is comparable to that reported for bulk material establishing that pure and modified $Ta_2O_5$ thin films have great potential for various electronic applications.

The present invention describes a design scheme for the fabrication of discrete and integrated thin film microwave components and systems. The present invention proposes the use of pure and modified $Ta_2O_5$ thin films for microwave applications. The proposed design schemes overcome the inconvenience of designing and fabricating shunt components and provide a higher level of integration.

The present invention describes a chemical solution process for the fabrication of pure and modified $Ta_2O_5$ thin films for microwave applications. The pure and modified $Ta_2O_5$ thin films having high dielectric constant, low dielectric loss, and high thermal and bias stability can be deposited on any substrate and various microwave components and systems can be made on the surface of the deposited pure or modified $Ta_2O_5$ film.

The pure and modified $Ta_2O_5$ thin film can also be used as a buffer layer on any substrate for the deposition of any material system on top of it that is suitable for the fabrication of microwave component and systems. The present thin film fabrication process and design schemes will provide a simple, reliable and cost-effective design of discrete and integrated microwave components and system.

DETAILED DESCRIPTION OF THE PREFERRED EMBODIMENTS

This invention describes fabrication of $Ta_2O_5$ and $Ta_2O_5$ based composite thin films by chemical precursor solution deposition technique. This invention provides room temperature chemical precursor solution preparation techniques for the fabrication of thin films at low annealing temperatures.

A chemical precursor solution technique using carboxylate-alkoxide combination has been developed which provides crystalline phase even at low annealing temperatures. The main features of the process are short preparation time, easy availability of precursors, stability and compatibility with semiconductor fabrication technology. A rapid fabrication process is desirable, since long processes are more expensive and labor intensive.

Figure 1:
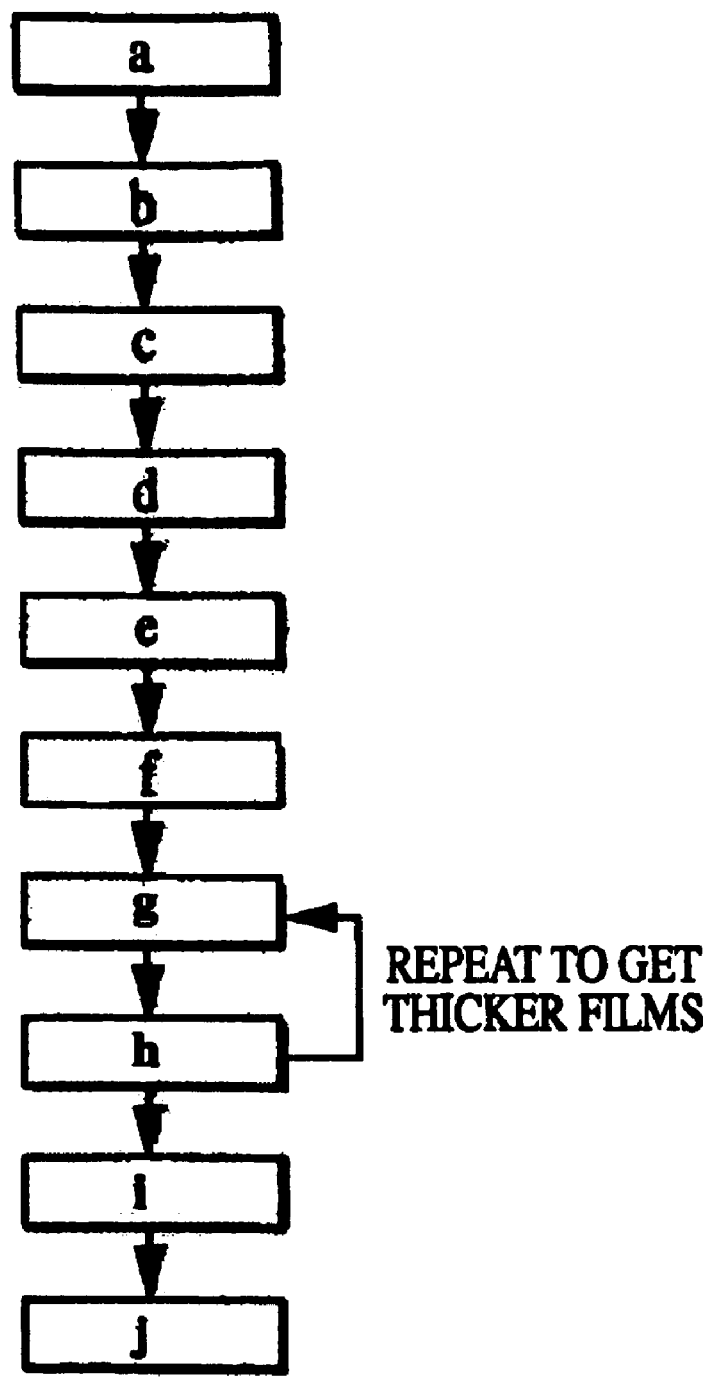
FIG. 1 is a flow diagram of the steps in the fabrication of films by the present invention.

The process is easily compatible with conventional integrated circuit materials and processes. FIG. 1 shows the general steps in the fabrication of films by the technique described in this invention.

First, the precursor compounds and the solvents are selected. The selection of precursor compounds and the solvents is an important step in the preparation of thin films by chemical technique using precursor solution. The process starts with preparing a precursor solution containing each of the metals in the desired thin film compound. There are several, general methods for the preparing the precursor solution for the fabrication of oxide thin films. These include an all alkoxide method and an alkoxide-salt method. The metal alkoxides or carboxylates can be selected as the starting precursors. Alternatively, nitrates, sulfates, carbonates, chlorides and hydroxides can also be selected as precursors. In the absence of these precursors, other chemicals can be modified to prepare the desired chemical solution. A single solvent or a combination of solvents can be used to optimize the solubility and viscosity to obtain high quality coatings.

Second, the individual precursors are dissolved in the selected solvents and then mixed to obtain a final homogenous solution. Thirdly, the hydrolysis and polycondensation of the final solution is controlled to stabilize the final solution. Next the precursor solution is deposited on the substrate. The films can be prepared from the precursor solution using spin, dip or spray technique. Almost any substrate that will support a thin film and is compatible with the materials and processes may be used. The film produced on the substrate by the deposition step is a wet film. Thus, the film is then baked for removal of organic content. The resulting wafer is then transferred to a hot plate and baked. Alternatively, an oven may be used in baking if it is desirable to control ambient conditions. Optionally, a drying step may be incorporated between the coating and the baking stages. The coating and baking steps may be repeated to obtain an optimal coating thickness. Subsequent to the last coating and baking steps, the film is annealed in a diffusion furnace or in a rapid thermal annealing system. Annealing is preferably achieved at different temperatures and times and within an oxygen atmosphere at different flow rates. Post-deposition annealing can also be conducted in different gaseous atmospheres to enhance the structural and electrical properties.

Depending on the type of substrate and the processing procedure, crystalline films with different morphologies can be obtained. The most common product is polycrystalline film with no apparent preferred crystallographic orientations. However, texture-oriented films may be obtained under several special conditions.

Major candidates for bottom electrode for $Ta_2O_5$-based composite insulating thin films include noble metals, conductive metal oxides, hybrid metal-oxide perovskite metal oxides, and traditional semiconductor materials. The term bottom electrode includes any structure on which the insulating film is deposited.

For the top electrodes, any material can be selected that will allow for good interface with the insulating film and retain high capacitance as well as low leakage current. The top electrode can be deposited by any appropriate physical and/or chemical deposition process. The adhesion between the top electrode and the film can be improved by further heat treatment. The capacitor configuration formed by depositing the top electrode can be used for various integrated electronic devices.

Figure 2A:
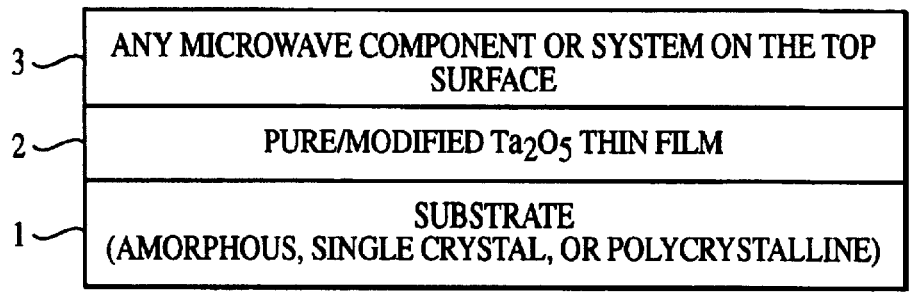
FIG. 2(a) is a design scheme for the fabrication of microwave components and systems on the top surface of the film.

The pure/modified $Ta_2O_5$ thin films with enhanced properties are suitable for discrete and integrated microwave components and systems. The pure/modified $Ta_2O_5$ thin film (2) can be deposited by the present fabrication technique on any substrate (1), glass, single crystal, or polycrystalline ceramic, for the fabrication of microwave components and systems on the top surface of the film (3). A schematic of this configuration is shown in FIG. 2(a).

Figure 2B:
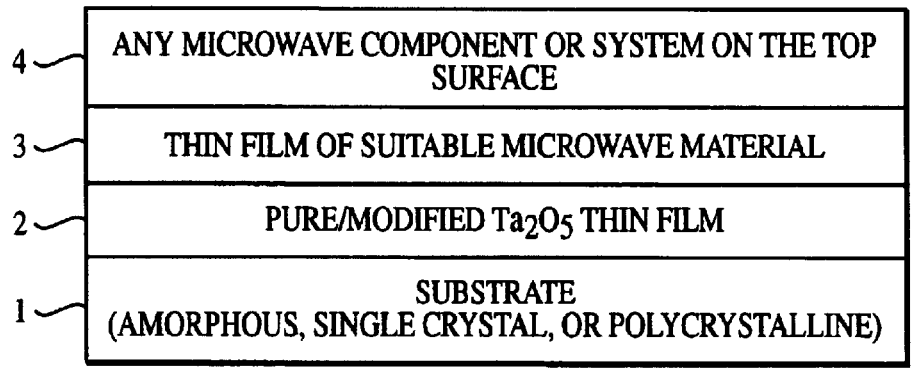
FIG. 2(b) is a design scheme for the fabrication of microwave components and systems with a $Ta_2O_5$ buffer layer.

The pure/modified $Ta_2O_5$ thin films can also be used as a buffer layer for the deposition thin film of any suitable microwave material on top of it. In this configuration, as shown in FIG. 2(b), the pure/modified $Ta_2O_5$ thin film (2) can be deposited on any suitable substrate (1) and then the thin film of any suitable microwave material can be deposited on the top of it (3). Then the microwave components and systems can be fabricated on top of the thin film of suitable microwave material (4).

These design schemes can be used for the fabrication of microwave components and systems on the same side of the dielectric layer. This design scheme will overcome problems of inconvenience for designing and fabricating shunt components in designs where the ground plane is on the opposite side of the substrate to the circuitry. The surface integration scheme also provides a higher level of integration and reduced parasitic effects. This method allows both the circuit itself and the ground plane to be fabricated on the same side of the substrate. Thereafter, this semiconductor thin film technology can be used for the fabrication of various microwave components and systems. The present thin film fabrication technique is compatible with the semiconductor processing technology.

Thin films of these composite materials can also be fabricated by various physical vapor deposition and chemical vapor deposition techniques. The properties of $Ta_2O_5$ thin films can be enhanced through substitution with single metal element or multi-metal element complex oxides of metals.

EXAMPLE $Ta_2O_5$ and $(1-x)\ Ta_2O_5-xAl_2O_3$ Thin Films

Figure 3:
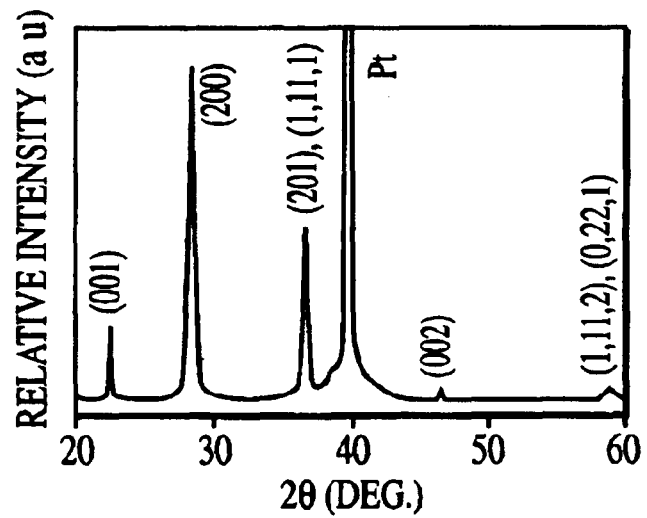
FIG. 3 shows an X-ray diffraction pattern of $Ta_2O_5$ thin films.
Figure 4:
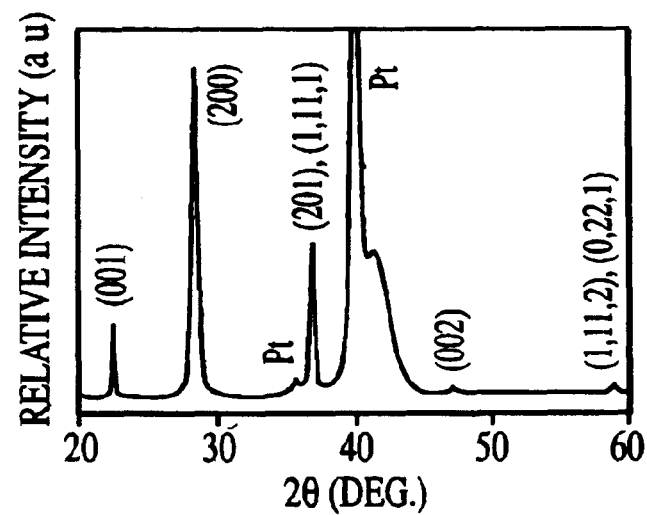
FIG. 4 shows an X-ray diffraction pattern of 0.9 $Ta_2O_5$–0.1$Al_2O_3$ thin films.
Figures 5, 6:
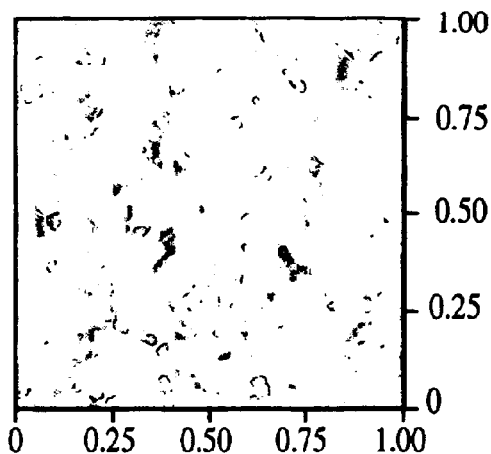
FIG. 5 shows an AFM photograph of 0.9 $Ta_2O_5$–0.1$Al_2O_3$ thin films.
FIG. 6 is a table of enhanced dielectric and insulating properties of 0.9 $Ta_2O_5$–0.1$Al_2O_3$ thin films.

Thin films of $Ta_2O_5$ and $(1-x)\ Ta_2O_5-xAl_2O_3$ were fabricated by the chemical precursor solution technique using room temperature solution preparation procedure. For the preparation of $Ta_2O_5$ and $(1-x)\ Ta_2O_5-xAl_2O_3$ thin films, tantalum ethoxide and aluminum nitrate were selected as precursor. Acetic acid and 2–methoxyethanol were selected as solvents. The viscosity of the solution was controlled by varying the 2-methoxyehtalol content. The final solution was stable, clear and transparent. After spinning onto various substrates, films were kept on a hot plate in air for 10 minutes. After each coating, this step was repeated to ensure complete removal of volatile matter. The post-deposition annealing of the films, was carried out in an oxygen atmosphere. The present films were annealed at 750° C. in an oxygen atmosphere. The x-ray diffraction patterns, as shown in FIGS. 3 and 4, indicated that $Ta_2O_5$ and $0.9\ Ta_2O_5-0.1\ Al_2O_3$ thin films were well crystallized into orthorhombic phase. FIG. 5 shows the atomic force micrograph of 0.9 $Ta_2O_5-0.1\ Al_2O_3$ thin film annealed at 750° C. The surface morphology of the films was smooth with no cracks and defects, as shown in FIG. 5, and the average surface roughness was less than 0.3 mm. The films exhibited a dense microstructure and the grain size was very fine. The electrical characteristics were obtained on films in metal-insulator-metal (MIM) configuration. The MIM capacitors were prepared by depositing Pt electrodes through a mask on the top surface of the film by sputtering. The bottom Pt electrode was accessed by etching the film. The electrical properties of modified $Ta_2O_5$ thin films are summarized in FIG. 6. The dielectric constant for $0.9\ Ta_2O_5-0.1Al_2O_3$ thin films was found to be much improved compared to the typical value ($\epsilon$~25–30) reported for $Ta_2O_5$ thin films. The dielectric constant value was comparable to that reported for bulk ceramic. The loss factor was found to be much lower than values reported for $Ta_2O_5$ thin films fabricated by various techniques. The $0.9\ Ta_2O_5-0.1Al_2O_3$ capacitors exhibited enhanced temperature and bias stability of the dielectric properties and significantly reduced leakage current density as compared to reported values for $Ta_2O_5$ based capacitors. The high dielectric constant, low dielectric loss, and good thermal and bias stability characteristics show the suitability of $0.9\ Ta_2O_5-0.1Al_2O_3$ thin films as the insulating dielectric layer for large value capacitors for various electronic devices.

What is claimed is:

1. A method for fabricating composite thin films comprising the steps of:

(a) selecting precursor compounds and solvents and forming a chemical precursor solution;

(b) dissolving said precursor compounds in said solvents and forming a homogenous solution;

(c) hydrolyzing and polycondensating said precursor solution and stabilizing said precursor solution;

(d) depositing said chemical precursor solution onto a suitable substrate and forming a wet thin film of $Ta_2O_5$;

(e) drying said wet thin film;

(f) baking said thin film and removing organics present;

(g) forming a continuous $Ta_2O_5$ thin film on said substrate;

(h) baking said continuous $Ta_2O_5$ thin film deposited on substrate under ambient conditions;

(i) repeating steps (g) and (h) and obtaining a desired thickness of said thin film; and (j) annealing said continuous $Ta_2O_5$ thin film deposited on said substrate at varying temperatures, times and oxygen flow rates and forming said composite thin films having high dielectric constants and low dielectric loss at microwave frequencies.

2. The method for fabricating composite thin films of claim 1 wherein annealing step "i" is accomplished at about 750° C.

3. The method for fabricating composite thin films of claim 1 wherein annealing step "i" is accomplished in an oxygen environment.

4. The method for fabricating composite thin films of claim 1 wherein annealing step "i" is accomplished in an oxygen environment at about 750° C.

5. The method for fabricating composite thin films of claim 1 wherein in step "a" tantalum ethoxide and aluminum nitrate are selected as said precursor compounds.

6. The method for fabricating composite thin films of claim 1 wherein in step "a" acetic acid and 2-methoxyethanol are selected as said solvents.

7. The method for fabricating composite thin films of claim 1 wherein said composite thin films have an average surface roughness less than 0.3 mm.

8. The method for fabricating composite thin films of claim 1 wherein said composite thin films exhibit a dense microstructure and very fine grain size.

* * * * *

UNITED STATES PATENT AND TRADEMARK OFFICE
CERTIFICATE OF CORRECTION

PATENT NO. : 6,919,283 B2
DATED : July 19, 2005
INVENTOR(S) : Pooran C. Joshi

It is certified that error appears in the above-identified patent and that said Letters Patent is hereby corrected as shown below:

<u>Title page,</u>
Item [75], should read:
-- Inventors: Pooran C. Joshi, Vancouver, WA (US)
               Melanie W. Cole, Churchville, MD (US)
               Eric Ngo, Bel Camp, MD --.

Signed and Sealed this

Thirtieth Day of August, 2005

JON W. DUDAS
*Director of the United States Patent and Trademark Office*